United States Patent [19]

Kanigan

[11] 4,122,905
[45] Oct. 31, 1978

[54] HAND AUGER

[75] Inventor: Frederick R. Kanigan, Nelson, Canada

[73] Assignee: The Raymond Lee Organization, Inc., New York, N.Y.; a part interest

[21] Appl. No.: 787,771

[22] Filed: Apr. 15, 1977

[51] Int. Cl.² .................. E21C 19/00; A01B 1/00
[52] U.S. Cl. .................................. 175/396; 172/381; 294/50.7
[58] Field of Search ............... 172/21, 22, 371, 381; 175/396, 403; 408/210, 230; 111/4, 99; 294/50.5, 50.6, 50.7; 30/130, 276, 301, 302

[56] References Cited

U.S. PATENT DOCUMENTS

| 762,750 | 6/1904 | Palmer | 175/396 |
| 1,110,517 | 9/1914 | Watkins et al. | 175/396 |
| 3,219,378 | 11/1965 | Padoshek | 294/50.7 |

FOREIGN PATENT DOCUMENTS

| 2,267,689 | 11/1975 | France | 294/50.7 |
| 177,172 | 8/1935 | Switzerland | 175/396 |
| 9,188 of | 1884 | United Kingdom | 294/50.7 |
| 476,583 | 12/1937 | United Kingdom | 294/50.7 |

Primary Examiner—Richard T. Stouffer
Attorney, Agent, or Firm—Daniel Jay Tick

[57] ABSTRACT

A hand auger comprises a frustoconical sheet of material split along a lateral strip to form a pair of lateral edges in spaced relation radially and circumferentially. One of the edges is an inner edge of predetermined length and the other of the edges is an outer edge having a length longer than the predetermined length and extending beyond the inner edge at the bottom edge of the sheet. The bottom edge of the sheet is of spiral configuration from the bottom of the inner edge to the bottom of the outer edge. The base edge is of split circular configuration.

3 Claims, 6 Drawing Figures

HAND AUGER

BACKGROUND OF THE INVENTION

The present invention relates to a hand auger.

Objects of the invention are to provide a hand auger of simple structure, which is inexpensive in manufacture, used with facility, convenience and safety, extremely light in weight and easily handled by an individual, and functions efficiently, effectively and reliably to dig a small hole for a desired purpose such as, for example, gardening purposes.

BRIEF DESCRIPTION OF THE DRAWINGS

In order that the invention may be readily carried into effect, it will now be described with reference to the accompanying drawings, wherein.

DETAILED DESCRIPTION OF THE INVENTION

Figure 1:
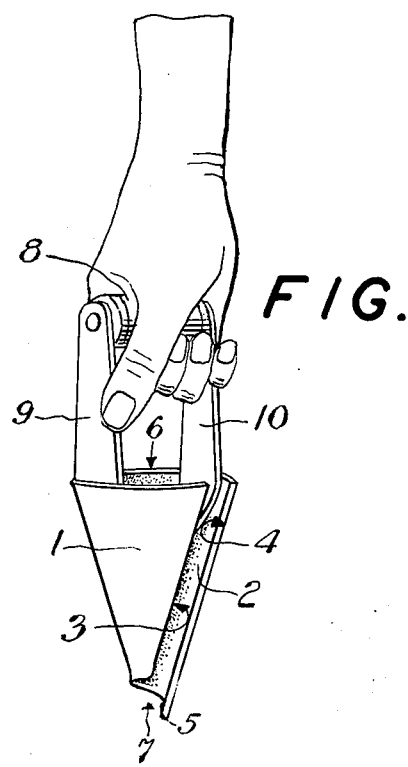
FIG. 1 is a view of an embodiment of the hand auger of the invention manually grasped for use.

The hand auger of the invention comprises a substantially frustoconical sheet of material 1 split along a substantially lateral strip 2 (FIGS. 1, 4 and 5) to form a pair of substantially lateral edges 3 and 4 (FIGS. 1, 2, 4, 5 and 6) in spaced relation radially and circumferentially. The edge 3 is an inner edge of predetermined length L1 (FIG. 2) and the edge 4 is an outer edge having a length L2 longer than the predetermined length L1 and extending beyond the inner edge at the bottom edge 5 of the sheet, as shown in FIGS. 1, 2, 4 and 6.

Figure 2:
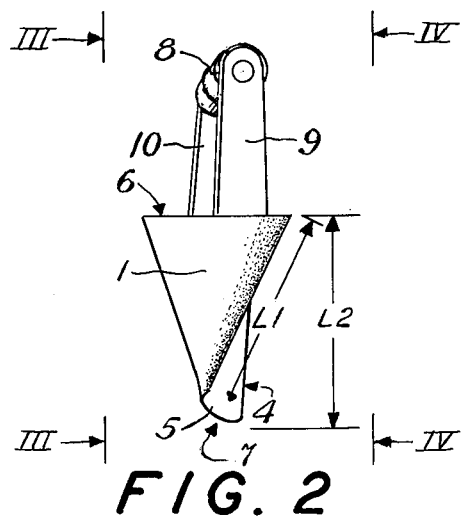
FIG. 2 is another view of the embodiment of FIG. 1.
Figure 3:
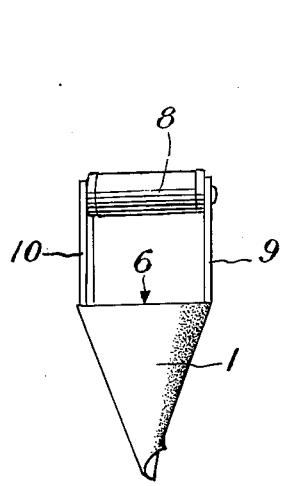
FIG. 3 is a view, taken along the lines III—III, of FIG. 2.
Figure 5:
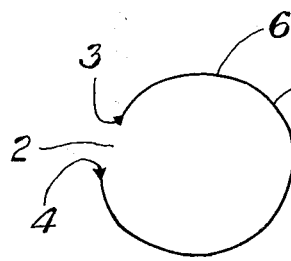
FIG. 5 is a view, on an enlarged scale, of the base edge of the sheet of the hand auger of the invention.
Figure 4:
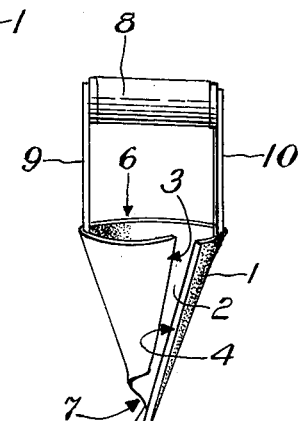
FIG. 4 is a view, taken along the lines IV—IV of FIG. 2.

The bottom edge 5 of the sheet 1 is of substantially spiral configuration, from the bottom of the inner edge 3 to the bottom of the outer edge 4 (FIGS. 1, 2 and 4). The base or top edge 6 is of split circular configuration, as shown in FIG. 5.

A cutting edge is formed along the outer edge 4 of the sheet 1 (FIGS. 1, 2, 4, 5 and 6). An additional cutting edge 7 is formed in the sheet 1 at the bottom edge 5 between the inner and outer edges 3 and 4, as shown in FIGS. 1, 2, 4 and 6.

As shown in FIGS. 1 to 4, a handle 8 is affixed to the sheet 1 of material at the base edge 6 thereof and extends therefrom to enable a user to manually grasp the auger in the area of the base edge thereof, as shown in FIG. 1.

The material of the sheet 1 may comprise any suitable material such as, for example, a suitable metal, metal alloy, tough plastic, or the like. The handle 8 is preferably affixed to the sheet 1 via a pair of arms 9 and 10 affixed to and extending in spaced parallel relation from the base edge of the sheet.

Figure 6:
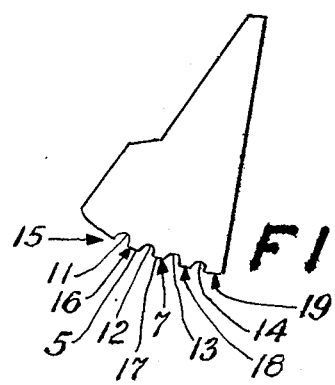
FIG. 6 is a lateral view, on an enlarged scale, of the base edge of the sheet of the hand auger of the invention.

The bottom edge 5 of the sheet 1 has a plurality of equidistantly spaced almost circular cutouts 11, 12, 13 and 14 therein, as shown in FIG. 6. The cutouts 11 to 14 form a plurality of cutting teeth 15, 16, 17, 18 and 19 along the bottom edge 5 between the inner and outer edges 3 and 4, respectively, as shown in FIG. 6.

While the invention has been described by means of specific examples and in specific embodiments, I do not wish to be limited thereto, for obvious modifications will occur to those skilled in the art without departing from the spirit and scope of the invention.

I claim:

1. A hand auger, comprising
a substantially frustoconical sheet of material having a substantially circular base edge and a bottom edge spaced from the base edge, said sheet of material being split along a substantially lateral strip to form a pair of substantially lateral edges in spaced relation radially and in spaced relation circumferentially from the bottom edge to an area intermediate the base and bottom edges, one of the edges being an inner edge of predetermined length and the other of the edges being an outer edge having a length longer than the predetermined length and extending beyond the inner edge at the bottom edge of the sheet to substantially a point, the bottom edge of the sheet being of substantially spiral configuration from the bottom of the inner edge to the bottom of the outer edge and the base edge being of split circular configuration and having a plurality of equidistantly spaced substantially circular cutouts formed therein forming a plurality of cutting teeth along said bottom edge between the inner and outer edges from said outer edge to a point intermediate said inner and outer edges; and
a handle having a pair of arms affixed to the sheet in the area of the base edge thereof and extending in spaced parallel relation from said base edge to enable a user to manually grasp the auger in the area of said base edge.

2. A hand auger as claimed in claim 1, further comprising a cutting edge formed along the outer edge of the sheet.

3. A hand auger as claimed in claim 1, further comprising an additional cutting edge formed in the sheet at the bottom edge between the inner and outer edges.

* * * * *